United States Patent [19]

Culbertson

[11] 4,157,324

[45] Jun. 5, 1979

[54] HIGH ORTHO ETHERIFIED RESOLE RESINS ADMIXED WITH COREACTIVE RESINS

[75] Inventor: Harry M. Culbertson, Belchertown, Mass.

[73] Assignee: Monsanto Company, St. Louis, Mo.

[21] Appl. No.: 920,597

[22] Filed: Jun. 29, 1978

Related U.S. Application Data

[60] Continuation-in-part of Ser. No. 763,763, Jan. 31, 1977, abandoned, which is a division of Ser. No. 647,958, Jan. 9, 1976, abandoned.

[51] Int. Cl.$^2$ .................... C08G 8/36; C08L 61/10; C08L 61/14
[52] U.S. Cl. .................. 260/32.8 R; 260/14; 260/29.3; 260/33.4 R; 260/33.6 R; 260/831; 260/838; 260/841; 260/842; 260/844; 428/436; 428/480; 428/524; 428/531; 528/130; 528/134; 528/136; 528/139; 528/140; 528/144; 528/151; 528/152
[58] Field of Search ............... 260/831, 838, 841, 842, 260/844, 32.8 R, 33.4 R, 33.6 R, 29.3; 528/139, 140, 130

[56] References Cited

U.S. PATENT DOCUMENTS

| | | | |
|---|---|---|---|
| 3,485,797 | 12/1969 | Robins | 260/38 X |
| 3,630,977 | 12/1971 | Broecker et al. | 260/19 |
| 3,637,429 | 1/1972 | Anderson et al. | 260/32.8 R |
| 4,017,437 | 4/1977 | Vasishth et al. | 260/29.3 |
| 4,022,942 | 5/1977 | Anderson et al. | 260/29.3 |
| 4,120,847 | 10/1978 | Culbertson | 260/831 X |

FOREIGN PATENT DOCUMENTS

| | | |
|---|---|---|
| 927041 | 5/1973 | Canada. |
| 773611 | 5/1957 | United Kingdom. |

OTHER PUBLICATIONS

J. of Polymer Science–Part (A), vol. 3, pp. 1079-1106, (1965), Woodbrey et al.
Phenolic Resins, Whitehouse et al., pp. 6-9, 20-21, 24-27, 66-71, (1968).

*Primary Examiner*—Howard E. Schain
*Attorney, Agent, or Firm*—David Bennett; William J. Farrington; James C. Logomasini

[57] ABSTRACT

This invention relates to high ortho etherified resole resins. The resole resins are prepared by reacting under acidic conditions phenol with formaldehyde in the presence of a divalent electropositive metal. The resole resins are then etherified with an alcohol and dehydrated to less than 1 percent water. The novel high ortho etherified resole resins are useful in coating, bonding and adhesive compositions. Such resoles are readily curable with coreactive resins providing chemical and solvent resistance.

15 Claims, No Drawings

HIGH ORTHO ETHERIFIED RESOLE RESINS ADMIXED WITH COREACTIVE RESINS

This is a continuation-in-part of prior application Ser. No. 763,763 filed Jan. 31, 1977, now abandoned which is a divisional of prior application Ser. No. 647,958 filed Jan. 9, 1976, now abandoned.

BACKGROUND OF THE INVENTION

The field of the present invention is compositions based on high ortho alkoxymethyl and aralkoxymethyl etherified phenolformaldehyde resins.

Phenolic ethers have been described in Kirk-Othmer "Encyclopedia of Chemical Technology", 2nd Edition, Vol. 8 (1965), pages 165-175 in which the phenolic aromatic hydroxyl is etherified as an aryl ether. In the case of the resole ethers which are characterized by having the methylol group ortho and para to the free aromatic hydroxyl etherified, relatively little prior art is known. The state of known prior art is set forth in U.S. Pat. Nos. 2,454,153, 3,630,977 and 3,650,996 which disclose the utility of ethers derived from methylol derivatives of difunctional phenols. The ethers described have the disadvantage of having only two reactive sites and, hence, are not self-curable and their chemical and solvent resistance is impaired. In U.S. Pat. No. 3,485,797 there are disclosed resole resin containing internal benzylic ether linkages only as contrasted to the present invention having both internal benzylic ether and alkoxymethyl or aralkoxymethyl ether linkages.

It is the objective of the present invention then to provide novel resole resins characterized by having either aralkoxymethyl and alkoxymethyl ether groups incorporated in their resole structure. The resoles are also characterized by having ortho-ortho and ortho-para functionality capable of being cured at elevated temperatures yet having great storage stability at temperatures of about 20°-25° C.

Another objective is to provide said resole resins that have high compatibility and reactivity with coreacting resins such as alkyds, epoxies, polyvinyl formals and butyrals.

Finally, it is an objective to provide methods of preparing said novel etherified resole resins.

SUMMARY OF THE INVENTION

The phenol resole ethers described herein are resinous mixtures of monomeric, dimeric and higher condensation products of phenol and formaldehyde, modified by etherification with monohydric alcohols and further modified by formation of dibenzyl ethers.

The monomer species are as shown below:

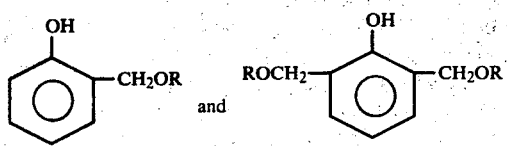

where R+H, CH$_3$, C$_2$H$_5$, C$_3$H$_7$, C$_4$H$_9$, etc.

The dimeric species are primarily as folows:

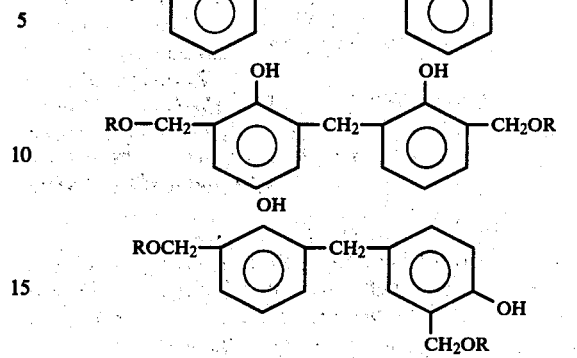

The higher condensation products may be represented as follows:

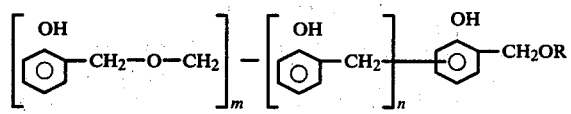

Complex mixtures of this type are best described in terms of number average structure as shown in "NMR of Phenolic Resins" of J. Poly Science 3:1079-1106 (1965) by Woodbrey, Higginbottom and Culbertson. In the case of the etherified resole being described here, the following terminology is used:

- R$_A$—aromatic protons per phenolic ring
- R$_{AM}$—methylol groups per phenolic ring
- R$_{EB}$—benzylether bridges per phenolic ring
- R$_{ME}$—alkoxymethyl or aralkoxymethyl ethers
- n—average number of rings per molecule
- M$_n$—number average molecular weight The structures given above clearly show that the methylol groups are preponderantly ortho to the phenolic hydroxyl and as a result the alkoxymethyl ethers and dibenzyl ethers are so oriented. The methylene bridges, on the other hand, are both ortho-ortho and ortho-para but rarely para-para.

Process for Preparation

Phenol and formaldehyde are heated together in an aqueous system in the presence of an ortho directing catalyst such as the oxide, hydroxide or organic acid salt of a divalent electropositive metal such as Zn++, Mg++, Mn++, Ca++ and Co++ or mixtures thereof. With the pH in the range of 4 to 7 the mixture is heated to 80°-100° C., until the formaldehyde is essentially all combined. A monohydric aliphatic alcohol is then added and the mixture heated at 65° to 100° C., until the desired degree of etherification and condensation has taken place. The resin is then dehydrated under reduced pressure to remove excess alcohol and water to yield a viscous syrup essentially free of solvents.

These novel phenolic compositions are characterized by unusual and valuable properties. The compositions are stable at room temperature for long periods of time yet are capable of being cured rapidly at elevated temperatures. They are near 100 percent reactive solids yet are still fluid at room temperature. Solubility in organic solvents, particularly hydrocarbons, is greatly enhanced over conventional resoles. Compatibility with co-reactants such as alkyds, epoxies, polyvinyl formals and polyvinylbutyrals is also greatly improved.

Although it is possible to prepare resole ethers employing the more expensive substituted phenols such as paratertiary-butylphenol, these in turn being difunctional in terms of a phenolic cure, produce only linear polymers with little or no crosslinking. Resins based on such substituted phenols thus require the addition of a more highly functional resin or co-reactant to produce a crosslinked system. The present resins derived from phenol, meta-substituted phenols or mixtures of phenol and substituted phenols other than meta-substituted phenols provide ortho and para activity and provide highly crosslinkable systems when cured and an improvement in properties such as hardness, gloss, chemical and solvent resistance.

The present invention then relates to:

A high ortho etherified resole resin coating composition comprising a high ortho etherified resole resin and about 1 to 95% by weight of a coreactive resin, said high ortho etherified resole resin being characterized by:

A. having a reacted formaldehyde to phenol mol ratio of 1.10 to 2.0, said formaldehyde reacting with said phenol, forming methylol groups taking a final orientation of about 90% to 100% in the ortho position, B. having said phenol selected from the group consisting of phenol, meta-substituted phenols and mixtures of phenol and substituted phenols, C. having condensed phenol-aldehyde linkages wherein 25 to 90% of said linkages are benzyl ether linkages having a final orientation essentially in the ortho position and 10 to 75% are methylene linkages taking a final orientation of about 70 to 90% in the ortho position and about 10 to 30% in the para position, D. having an average degree of polymerization of less than 4.0, and E. having said methylol groups partially etherified with monohydric alcohols.

The present invention also relates to a process for preparing a high ortho etherified resole resin by first reacting said phenol and said formaldehyde in an aqueous reaction mixture under reflux at about 80° C. to 100° C., in the present of a divalent electropositive metal ion while maintaining a pH in the range between about 4 to 7 wherein said pH is controlled by adding sufficient amounts of an organic acid and thereafter etherifying said resole resin with a monohydric alcohol at a temperature of 65° C. to 100° C., and dehydrating the resulting aqueous solution to a water content of less than about 1 weight percent and an alcohol content of less than about 5 percent.

The above is a preferred process. The etherified resole resin can also be prepared by adding all of the reactants including the alcohol in the initial reaction mixture and carrying out the methylolation and etherification and resin advancement simultaneously. It is preferred to carry out the methylolation as a separate step without alcohol present as the alcohol tends to retard methylolation. It is also possible to methylolate under alkaline conditions using, e.g., Ca++ and Mg++ ions at a pH above 7 and obtain high ortho orientation of the methylol groups followed by acidification to a range of 4 to 7 with etherification. This method requires careful control of catalyst concentration, temperature and time of reaction to prevent para orientation and resin advancement through methylene bridge formation.

DESCRIPTION OF THE PREFERRED EMBODIMENTS

The following examples are set forth to illustrate more clearly the principles and practice of the present invention to one skilled in the art and are not intended to be restrictive but merely illustrative of the invention herein contained.

Phenols used in this invention consist primarily of phenol and meta substituted phenols in which three active sites are available. Other substituted phenols substituted in the ortho or para position may be used in part with phenol to modify the properties but are not used exclusively. Formaldehyde is the preferred aldehyde and may be employed in a variety of forms, formalin 30 to 60 percent concentration or paraform. Alcohols used are monohydric alcohols and may be primary and secondary alcohols containing 1 to 12 carbon atoms and one —OH group. The resole resins are etherified with said alcohols incorporating in amounts of about 0.05 to 0.50, preferably 0.20 to 0.40 as methylol ether groups per phenolic group in the form of alkoxy methyl ethers or aralkoxy methyl ethers.

EXAMPLE 1

Preparation of a methylated etherified high ortho phenol-formaldehyde resole. Phenol, 700 parts and 50 percent formalin, 670 parts, are added to a stirred reactor along with 14 parts of zinc oxide and 14 parts acetic acid. The mixture is heated to reflux and after two hours is cooled to 50° C., and dehydrated at 29" Hg vacuum to remove 330 parts of water. Methanol, 700 parts, is then added and the mixture refluxed at 75° C., for five hours. Methanol and water are removed (300 parts) by atmospheric distillation until the temperature reaches 83° C., then held an additional six hours. The product is then vacuum dehydrated at 29" Hg vacuum to an end temperature of 83° C., to yield a syrup which had an ASTM solids of 78 percent. Yield was approximately 1000 parts. Analysis of the final product by proton magnetic resonance gave the following number average structure: 0.28 methoxymethyl groups per phenolic nucleus, 0.40 methylols, 0.22 methylene bridges and 0.19 benzyl ether bridges.

EXAMPLE 2

Preparation of a Butylated Etherified High Ortho Phenol-Formaldehyde Resole

Phenol 600 parts, and 574 parts, 50 percent formalin were charged to a stirred reactor and 24 parts zinc oxide and 36 parts acetic acid added. The mixture was refluxed for 2 hours at 100°–102° C., then 600 parts of n-Butanol added. The mixture was refluxed at 95° to 100° C., for 3½ hours while the water was being removed by azeotropic distillation. Excess butanol was then removed by vacuum distillation to an end temperature of 90° C., at 29.6" Hg vacuum. This yielded 942 parts of a viscous syrup of 88.9 percent ASTM solids. Analysis of the final product by proton magnetic resonance gave the following number average structure: 0.32 methylol groups per phenolic nucleus, 0.27 butoxymethyl groups, 0.32 methylene bridges and 0.27 benzyl ether bridges.

EXAMPLE 3

Preparation of a Butylated Etherified High Ortho Phenol-Formaldehyde Resole

Phenol 600 parts and 574 parts, 50 percent formalin were charged to a stirred reactor and 6 parts zinc oxide and 9 parts acetic acid added. The mixture was refluxed 2 hours at 100°-102° C., then 600 parts of n-Butanol added. Refluxed at 95°-100° C., for 3 hours while the water was being removed by azeotropic distillation. Excess butanol was then removed by vacuum distillation to an end temperature of 90° C. at 29.6" Hg vacuum. This yielded 885 parts of viscous syrup of 71 percent solids. Proton magnetic resonance analysis gave the following number average structure: 0.66 methylol groups per phenolic nucleus, 0.14 butoxymethyl groups, 0.11 methylene bridges and 0.20 benzyl ether bridges.

EXAMPLE 4

Mixed Phenol Etherified Resole Resin

Phenol 540 parts, p-nonylphenol, 140.4 parts and 574 parts, 50 percent formalin were charged to a stirred reactor and 12 parts zinc oxide and 18 parts acetic acid added. The mixture was refluxed 2 hours at 100°-102° C., then 600 parts n-butanol added. Refluxed at 95°-100° C., for 3 hours while the water was being removed by azeotropic distillation. Excess butanol was then removed by vacuum distillation to give 1005 parts of a viscous syrup of 80 percent ASTM solids with a viscosity of 8000 cps. Proton magnetic resonance analysis gave the following number average structure: 0.53 methylol groups per phenolic nucleus, 0.28 butoxymethyl groups, 0.18 methylene bridges and 0.24 benzyl ether bridges.

EXAMPLE 5

Synthesis of a Styrene Substituted Phenol and a Butylated Etherified Resole Resin Phenol 600 parts, $H_2SO_4$ 1.8 parts are charged to a stirred reactor and heated to 80° C. Styrene, 180 parts is added slowly over a period of 30 minutes holding the temperature at 115° C. After the addition is complete the temperature is held at 110°-115° C. an additional 30 min. then cooled to 50° C. and 15 parts zinc oxide and 12 parts acetic acid are added. Formalin (50%) 574 parts are added and the mixture heated to reflux. The mixture is refluxed at 100°-102° C. for 2 hours then 600 parts butanol and 24 parts xylol are added. The mixture is again brought to reflux at 95° C. and water removed azeotropically over a period of 3 hours. Excess butanol was then removed by vacuum distillation to yield 1111 parts of a viscous syrup of 80.5% ASTM solids and a viscosity of 7000 cps.

EXAMPLE 6

Preparation of Stable Aqueous Emulsions by Butylated Etherified Phenolic Resole Resin of Ex. 5, 50.5 parts was added slowly to 200 parts of an aqueous solution containing 4 parts hydroxyethyl cellulose and 1 part Aerosol OT with intense agitation in a Warinb Blender. A smooth homogeneous emulsion formed immediately and which remained stable for over two months.

EXAMPLE 7

Chemically Resistant Coating Varnish Composition Based on Butylated Etherified Phenolic Resole A mixture of 32 parts butylated phenolic resole of Ex. 2, 3.2 parts polyvinyl formal resin (Formvar 15/95 "E" commercially available from the Monsanto Co. St. Louis, Mo. under the Trademark Formvar), 15.9 parts furfuraldehyde and 15.9 parts 70% isopropanol are stirred together until the Formvar has completely dissolved. The mixture is then catalyzed with 1.2% $H_3PO_4$ based on total resin content. Sheet steel is coated with the above formulation then baked 12 min. at 400° F. The cured film is tough with extremely good chemical resistance.

The substituted phenols are preferably meta substituted phenols to insure ortho and para activity for rapid curing. Substituted phenols having ortho and para substitution are functional when used with phenol to insure ortho and para activity. Such phenols can be used in combination with phenol or mixtures wherein the substituted phenols is present in the mixture in amounts up to about 50 percent by weight of the mixed phenols.

The meta substituted phenol having at least one attached radical selected from the group consisting of alkyl, aryl, cycloalkyl, alkenyl, cycloalkenyl, alkaryl, aralkyl, carbocylic, halogen and mixtures thereof.

The substituted phenols useful in the resins of this invention are all phenols that have at least one reactive position open in the ortho or para position. Phenol and such substituted phenols or their mixtures can be used. Substituted phenols include all phenols having at least one attached radical selected from the group consisting of alkyl, aryl, cycloalkyl, alkenyl, cycloalkenyl, alkaryl, aralkyl, carbocylic, halogen and mixtures thereof.

Examples of substituted phenols include: phenols substituted with straight and branched chain alkyl radicals having 1 to 16 carbon atoms, e.g., cresol, isopropylphenol, 2,3-xylenol, 3,5-xylenol, 3,4-xylenol, 2,6-xylenol, mono and disubtituted butyl, amyl, octyl, nonyl, decyl and dodecyl phenols; aryl substituted phenols, e.g., phenyl phenol and naphthyl phenol; cycloalkyl phenols, e.g., terphenylphenols, e.g., using limonene, pinene, methadiene, cyclohexyl and cyclopentyl; cycloalkenyl phenols, e.g., cyclopentenyl, dicyclopentadieneyl and methacyclopentadieneyl phenols; alkenyl phenols, e.g., allylphenol, butenylphenol, pentenylphenol, hexenylphenol; alkaryl phenols, e.g., tolylphenol, xylylphenol, propylphenylphenol; aralkyl phenols, e.g., benzyl, phenethyl, alphamethyl, phenyethyl, indyl and cumyl phenols bisphenol A, bisphenol F, halophenols, e.g., chlorophenols, bromophenols, 2,4-dichlorophenol, 2,6,-dichlorophenol, etc.

The substituted phenols can be prepared under Friedel-Craft conditions as disclosed in U.S. Pat. No. 3,637.429. When phenols selected from the group of phenol, meta substituted phenol and a mixture of phenol and at least one substituted phenol are reacted with aldehydes using a high aldehyde-phenol ratio under acid conditions in the presence of an organic acid salt of a divalent metal ion high ortho phenol-aldehyde resole resins are formed.

The particular catalysts used were selected from a group consisting of an oxide, or hydroxide or organic acid salt of a divalent electropositive metal ion.

Divalent electropositive metals of oxides or hydroxides or organic acid salts employed in accordance with the invention are calcium (Ca++), barium (Ba++), strontium (Sr++), magnesium (Mg++), zinc (Zn++), manganous (Mn++), manganese, cadmium (Cd++), cobaltous (Co++), cobalt and plumbous (Pb++) lead. Preferred metals are magnesium (Mg++), zinc (Zn++) and manganous (Mn++), manganese and cobalt (Co++).

When an organic acid salt is employed, it is preferred that it be a salt of an aliphatic monocarboxylic acid such as formic acid or acetic acid, however, the salt can also be derived from an aliphatic hydroxycarboxylic acid such as lactic acid, or the salt can be derived from aromatic carboxylic acids such as benzoic acid or dicarboxylic acids such as adipic and succinic. Typical salts useful for the purpose of the invention are cadmium formate, zinc acetate, magnesium acetate, manganese acetate, lead acetate and zinc benzoate.

The organic acid is selected such that the salt formed with the divalent electropositive metal is soluble in catalytic amounts in the reacting mixture. The organic acids described above also form soluble organic salts in situ with the metal oxides and hydroxides. Regardless of theory, the divalent metal ions provided by the oxides, hydroxides or salts are provided in soluble form to direct the condensation of the formaldehyde with the phenol giving a high ortho orientation. The organic acid is used in sufficient quantities to insure the solubility of the metal ion and maintain the pH in the range of about pH4 to pH7. In general the amount of oxide or hydroxide or salt, calculated as a percentage based on the amount of phenol, is within the range of 0.1 to 10 percent, the preferred amount being within the range of 1.0 to 5.0 percent.

The high ortho etherified phenol formaldehyde resins of this invention differ from prior art conventionally alkaline catalyzed resole resins in that they have a final orientation of 90 to 100 percent in the ortho position and in addition the condensed phenol linkages are characterized by having about 25 percent to 90 percent dibenzyl ether structures. In contrast, alkaline catalyzed resoles have about 0 percent to 5 percent benzyl ether linkages and significantly less than 80 percent substitution in the ortho position.

The resins of this invention are further characterized by having a relatively low degree of condensation or polymerization, e.i., less than 4 and are capable of giving a cure rate of less than 30 minutes, preferably less than 20 minutes at 150° C., to a fully crosslinked polymer.

Certain high ortho resole resins are known, however, they differ from the present invention in that the phenol-formaldehyde reactions taught are only those for the ortho position with no para reactions and have degrees of polymerization greater than 4. Such resins are deficient in that they are extremely slow curing and in fact need external curing reagents to effect thermosetting properties such as the use of acids, hexa or isocyanates for curing such resins.

Further, since there are no reacting groups in the para position they can only provide high molecular weight resins with a degree of polymerization of greater than 4 giving slow or negligible cure rates for the resulting polymers.

This lack of thermosetting character is overcome by the present invention by controlling the formaldehyde to phenol reaction to give 10 to 30 percent para orientation in methylene bridge formation essential for chain branching and true thermosetting characteristics. The further effect of having appreciable amounts of para orientation is that the thermosetting characteristics are obtained without the addition of external catalysts and with resins having a low degree of polymerization, e.i., having a DP of less than 4. This para activity also allows for the use of various substituted phenols, in particular ortho substituted phenols in admixture with phenol and within the scope of this invention.

In general, to produce a high ortho resole intermediate resin for use in this invention, a phenol or mixture of phenols are reacted under acid aqueous liquid phase conditions with from about 1.1 to 2.8 mols of formaldehyde per mol of phenol (preferably from 1.1 to 2.0 mols formaldehyde per mol of phenol) providing a reacted formaldehyde to phenol ratio of 1.1 to 2.0, preferably 1.25 to 2.0, in the presence of a catalyst selected from the group consisting of an oxide or hydroxide or organic acid salt of a divalent electropositive metal. Said group is at least partially soluble in the reacting mixture having an organic acid present in such amount that the reacting mixture is maintained between pH4 and pH7.

This reaction mixture is then heated to temperatures of from about 80° to 100° C., for a time sufficient to substantially react most of the formaldehyde and thereby produce a desired high ortho resole intermediate product. Times of from about 2 to 4 hours are typical. Aqueous liquid phase preparation conditions are used.

The high ortho phenol formaldehyde resole resin intermediate is then etherified with a monohydric alcohol at a pH of 4 to 7 at a temperature of 65° to 100° C., followed by dehydration the resulting aqueous solution to a water content of less than about 1 percent by weight and an alcohol content of less than 5 percent by weight forming a high ortho etherified phenol-formaldehyde resole resin of the present invention.

The alkoxymethyl or aralkoxymethyl ether and benzyl ether content and the degree of advancement are readily controllable, so that one can optimize such an etherified resole resin for use in a particular application. For purposes of this invention, a high ortho etherified phenol-formaldehyde resole resin or resole can be regarded as being the reaction product of the above-described phenol and formaldehyde and alcohol under the aqueous acid catalyzed conditions as described herein which product can be thermoset by heat alone without the use of a curing catalyst. In general, the etherified resole as made usually ranges from 5 to 100,000 cps as a liquid or varnish.

In making the etherified resole resin of this invention such an etherified resole is dehydrated, preferably under heat and reduced pressure, to a water content of less than 1 percent and an alcohol content of less than 5 percent (based on total resole weight). When the resulting water content is under about 1 weight percent, there is produced a single-phased, clear light-colored, high solids, viscous etherified resole resin varnish. In any given instance, its total solids content, (residual) water content, and viscosity depend upon the amount of phenol aldehyde product present, the mol ratio of formaldehyde to phenol, specific type and amount of methylolation catalyst, conditions and reactants used to substitute the phenol, methylolation temperature, degree of etherification, degree of advancement and the like.

After such dehydration, the resulting etherified resole resin or varnish can be dissolved in a relatively volatile, inert organic solvent medium if desired having properties as defined below. While the organic liquid used has properties as indicated below, it will be appreciated that such liquid can comprise mixtures of different organic liquids. Preferred liquids are lower alkanols (such as ethanol, methanol and propanol) and lower alkaones (such as acetone or methyl ethyl Ketone). The term "lower" refers to less than 7 carbon atoms per molecule as used herein. Aromatic and aliphatic (including cycloaliphatic) hydrocarbons can also be employed as solvents for a given resin, including benzene, toluene, xylene, naphthalene, nonene, petroleum fractions, etc. Preferably, the total water content of a varnish of the invention is below about 1 weight percent, however, with proper solvent can tolerate from about 0.5 to 30 percent water.

Those skilled in the art will appreciate that care should preferably be taken to use an organic liquid system in which high ortho etherified phenolic resole resins are completely soluble as well as any water present. Adding, for example, a ketone or an ether-ester solvent like butyl cellosolve will generally improve the water tolerance (ability to dissolve water) of a solvent system.

These varnishes are characteristically light colored, one-phase, clear liquid solutions, each having a viscosity ranging from about 5 to 100,000 centipoises. The exact viscosity of a given varnish depends upon many chemical process and product variables. For impregnating applications, viscosities of from about 100 to 1000 centipoises are preferred.

The total reactive solids content of a given varnish product can be as high as about 99 weight percent and as low as about 20 weight percent or even lower, but preferred reactive solids contents usually fall in the range of from about 25 to 85 weight percent. The varnishes of this invention are of lower viscosity and can be advanced (e.g., crosslinked as by heating to produce larger molecules) to a greater extent without forming precipitates from the organic solvent phase than is the case of corresponding alkaline resole products.

When used for impregnation and reinforcing purposes, the liquid resole resin varnishes of this invention are useful for impregnating cellulosic paper, asbestos paper, and other non-woven sheet structures as well as woven fabrics (cotton, glass fibers, nylon etc.), etc. Impregnation can be accomplished by any convenient means, including dipping, coating, spraying, mixing, or the like. The so-impregnated material is dried to lower the volatiles content and then heated to advance the resin to the proper degree for the intended use. The etherified resole varnishes of this invention are useful in the preparation of laminates, such as those made from such impregnated sheet materials. Such laminates are used in electrical applications as supports or as insulation for conductive elements. The laminates are generally manufactured in a sheet or block form which is then punched or otherwise machined to provide desired configurations for a particular end use.

The etherified resole varnishes of this invention are also useful in the manufacture of cloth laminates, and automotive oil filters. A suitable oil filter media, for example, is prepared by impregnating with a varnish of this invention, cellulosic fiber paper modified with a synthetic fiber (polyester, or the like) and having a thickness of from about 5 to 20 mils. Sufficient etherified resole varnish resin of this invention is used to obtain an impregnated sheet member having a cured resin content of about 15 to 25 percent, based on the weight of the paper. After such paper is so impregnated, it is heated to advance the resin to a so-called B-stage, and then is corrugated or pleated to form the filter element. The filter element is then assembled with the end use filter container and heated to 250° F. to 350° F., for from 5 to 20 minutes to cure the resin. When cured, the product has good flexibility and low tendency to crack during use.

In general, a varnish of the present invention can be used to make reinforced plastics.

The varnishes of this invention comprise:

A. from about 30 to 99 weight percent of reactive solids of a high ortho etherified phenol-formaldehyde resole resin, B. from about 0.5 to 30 weight percent of dissolved water, C. the balance up to 100 weight percent of any given varnish being an organic liquid which:
 1. is substantially inert (as respects such resin and water),
 2. evaporates below about 200° C., at atmospheric pressures, and
 3. is a mutual solvent for said resole resin and said water (if present), the amount of said organic liquid being present in any given varnish being such as to maintain both said resole resin and said water in dissolved form.

The etherified resole resin used in this invention further has a relatively low molecular weight and has an alcohol solubility such that a 60 weight percent solution thereof can be prepared in alcohol. Such alcohol solution characteristically has a viscosity not greater than about 2000 centipoises, and preferably this viscosity lies in the range from about 100 to 1000 centipoises.

The etherified resole resin of the present invention can be emulsified and used as stable aqueous emulsions for coatings, laminating, bonding, etc. The solids contents range from about 20 to 50 percent of reactive solids by weight of emulsion. Conventional nonionic emulsifiers can be used, e.g., hydroxy ethyl cellulose, partially hydrolyzed polyvinyl acetates having 15 to 30 percent polyvinyl alcohol content.

The etherified resole resins of the present invention can be used as coatings or components of coatings. A typical formulation is shown in Example 7. Such coreactant resins can include for example, alkyds, epoxies, polyvinyl formals, polyvinyl butyrals, polyvinyl acetate and polyesters. The etherified resole resin as prepared can be classed as a varnish having small amounts of phenol and alcohol, depending on the reactive solids content, having an alcohol content on the order of 1 to 5 percent. The etherified resole resins of the present invention are fluid at room temperature and, hence, can be used as high solid varnishes as compared to conventional resoles which have cured solids in the range of 50–65 percent in solvents and cannot be used as varnishes with high solids because they become too viscous and lack thermal stability.

The monohydric alcohols used in etherifying the high ortho resoles have been defined above and include alkyl or aliphatic alcohols and can be primary and secondary alcohols containing 1 to 12 carbons and one -OH group, for example, methyl, ethyl, propyl, butyl isobutyl, secondary butyl, amyl alcohols, etc. The aralkyl alcohols may be primary and secondary alcohols containing 1 to 12 carbon atoms and one -OH group, e.g., benzyl, phenethyl, e.g., 1-phenethyl and 2-phenethyl, etc. Unsaturated monohydric alcohols can be used such as allyl and cinnamic alcohol.

The high ortho etherified resole coating compositions comprise a high ortho etherified resole resin and about 1 to 95% by weight of a coreactive resin, said high ortho etherified resole resin being characterized by:

A. having a reacted formaldehyde to phenol mol ratio of 1.10 to 2.0, said formaldehyde reacting with said phenol, forming methylol groups taking a final orientation of about 90% to 100% in the ortho position, B. having said phenol selected from the group consisting of phenol, meta-substituted phenols and mixtures of phenol and substituted phenols, C. having condensed phenol-aldehyde linkages wherein 25 to 90% of said linkages are benzyl ether linkages having a final orientation essentially in the ortho position and 10 to 75% are methylene linkages taking a final orientation of about 70 to 90% in the ortho position and about 10 to 30% in the para position, D. having an average degree of polymerization of less than 4.0, and E. having said methylol groups partially etherified with monohydric alcohols, said etherified resoles being prepared by first reacting said phenol and said formaldehyde in an aqueous reaction mixture under reflux at about 80° C. to 100° C., in the presence of a divalent electropositive metal ion, while maintaining the pH in the range of about 4 to 7, wherein said pH is controlled by having a sufficient amount of an organic acid present, forming said resole in said reaction mixture, etherifying said resole with a monohydric alcohol at a temperature of 65° to 100° C. in said reaction mixture and dehydrating the resultant aqueous reaction mixture to a water content of less than about 1 weight percent and an alcohol content of less than about 5% by weight providing an etherified high ortho resole resin as a single phase clear liquid varnish.

The coating composition can further contain a solvent for said resole resin and said coreactive resin. Said solvent is selected from the group consisting of lower alkanols, lower alkones or aromatic and aliphatic hydrocarbons. These solvents can be those that are disclosed herein as solvents for the etherified resole resins. The preferred solvents are lower alkanols (such as ethanol), methanol and propanol) and lower alkaones (such as acetone or methyl ethyl Ketone). The term "lower" refers to less than 7 carbon atoms per molecule as used herein. Aromatic and aliphatic (including cycloaliphatic) hydrocarbons can also be employed as solvents for a given resin, including benzene, toluene, xylene, naphthalene, nonene, petroleum fractions, etc. Preferably, the total water content of a composition of the invention is below about 1 weight percent, however, with proper solvent can tolerate from about 0.5 to 30 percent water.

Those skilled in the art will appreciate that care should preferably be taken to use an organic liquid system in which high ortho etherified phenolic resole resins and the coreactive resins are completely soluble as well as any water present. Adding, for example, a ketone or an ether-ester solvent like butyl cellosolve will generally improve the water tolerance (ability to dissolve water) of a solvent system.

The etherified resole resins are low molecular resins having a degree of polymerization of less than 4, hence, exist as clear liquid varnishes which are curable to a high solids coatings that can be cured and dried as high solids coatings, i.e., 80 to 98% active ingredients.

The coreactive resins are also low molecular resins that have functional groups which can inter-crosslink with the etherified resole resin. These resins are generally oligomeric in nature, hence, are soluble in the resole varnish or in a mutual solvent for both resins. Such low molecular weight resins have no gel fraction and are commonly called A-type or green resins having high percentages of active ingredients that will cure to a high solids coating having an excellent balance of physical and chemical properties. Such coreactive resins are of such low molecular weight that they are not film forming as coatings until crosslinked by the etherified resole. The coreactive resin molecular weights are about 10,000 or less preferably 1000 or less, e.g. 200 to 1000 but have about 80 to 98% of active coating forming components for high solids, thermosetting baked coatings. The coreactive resins are present in the coating composition in amounts of 1 to 95% by weight of the coating composition preferably in amounts of about 30 to 70% by weight in high solids coating or about 15 to 35% by weight in relative low solids coatings having 40 to 60% solvent.

The coreactive functional groups on the coreactive resin can be selected from the group consisting of hydroxyl, carboxyl, acetal, amide, keto, methylol, isocyanate and alkoxymethyl groups or mixtures thereof as contained in commercial, alkyd, epoxy, polyvinyl formals, polyvinyl butryals, polyvinyl acetate, polyvinyl alcohol, polyesters, polyamides, polyurethanes and polyether resins. Polyacrylates can be used based on polymers or copolymers having a vinyl monomer containing a hydroxyl group, e.g. hydroxy alkyl esters of B-ethylenically unsaturated monocarboxylic acid, methacrylic acid, ethacrylic acid, e.g., 2-hydroxy ethyl acrylate.

The compositions can be cured thermally or with the aid of an acid catalyst, e.g. sulfonic acids such as paratoluene sulfonic, benzene sulfonic, etc. phosphoric, oxalic, succinic, lactic, benzoic, acetic acid, etc. which are less corrosive acids. Generally such acids can be used in amounts of about 0.01 to 3% by weight based on the total resin content of the composition. The etherified resole component of the present invention generally has a pH of about 4 yo 7, hence, will enable thermal curing, however, additional acid will accelerate curing in the pH range of 4 to 7.

Coating Tests

A butylated etherified phenolic resole similar to Example 2 containing 15% combined butanol and 82.5% ASTM solids (ASTM Test D-115-55) was formulated with a number of coreactive resins. One and two mil coatings were cast on Bonderized steel panels. The panels were baked at 300° F. for 30 minutes and the coatings evaluated for gloss, hardness solvent (MEK-methylethyl ketone) and water resistance as tested by water emersion at 25° C. for 96 hours.

EXAMPLE 8

Formulation:
5 grams Butylated Resole of Example 2
5 grams acrylic polymer having hydroxyl functionality
  78% solids in methyl n-amyl ketone Supplied by Rohm and Haas as AT-400
0.2 grams paratoluenesulfonic acid The above formulation at 80% total solids (ASTM) with 11% free solvent was cast as a 2 mil film and baked 30 minutes at 300° F. to give a clear glossy coating light yellow in color. Pencil hardness was 2 H, MEK resistance was excellent. The above formulation was reduced to 50% solids (ASTM) with butanol and cast and cured in the same manner to yield a 1 mil coating with excellent gloss, hardness of 6 H (pencil hardness) excellent MEK and water resistance.

EXAMPLE 9

Formulation:
6.1 grams Butylated Resole of Example 2 82% solids
10.0 grams Aroplaz 1855-M30 (50% solids in Xylol)
3.9 grams n-Butanol
0.2 grams paratoluenesulfonic acid The above formulation at 50% total solids was cast and baked 30' at 300° F., to give a 1 mil coating of good gloss and a 2 H pencil hardness. Aroplaz is an alkyd medium soya oil alkyd supplied by Ashland Chemical Company.

EXAMPLE 10

Formulation:
6.1 grams Butylated Resole of Example 2 82% solids
5.0 grams EP-5801 *(96-87% solids)
0.2 grams paratoluenesulfonic acid The 91% solids solution of the above formulation was clear and of low viscosity. A 2 mil film was cast and give a clear glossy coating after baking 30' at 300° F. The film was relatively soft with a pencil hardness of H. A one mil coating prepared from a 50% solution was hard, (pencil hardness 6H) and had moderate MEK and water resistance.

*EP 5801 is a low viscosity (600 cps) oligomeric polyester at 96-98% solids supplied by DuPont. This material is hydroxyl terminated and as in the present invention provides soft, high solids coatings.

EXAMPLE 11

Formulation:
5.0 grams Butylated Resole of Example 2
5.0 grams EP-5803* (90% solids)

The above formulation at 86% solids gave a hard glossy coating when cast as a 2 mil film then baked 30' at 300° F. Solvent resistance was excellent having a hardness of 3H. A one mil film cast from a 50% solution in butanol and baked 30' at 300° F. gave a coating with pencil hardness 6H, excellent solvent and water resistance.

*EP 5803 is a medium viscosity (9000 cps.) oligomeric, hydroxyl terminated polyester supplied by DuPont. As used in the present invention it provides hard coatings. This material can be used in conjunction with EP-5801 to provide cured high solids coatings of any desired hardness.

What is claimed is:

1. A high ortho etherified resole resin coating composition comprising a high ortho etherified resole resin and about 1 to 95% by weight of a coreactive resin, said high ortho etherified resole resin being characterized by:
A. having a reacted formaldehyde to phenol mol ratio of 1.10 to 2.0, said formaldehyde reacting with said phenol, forming methylol groups taking a final orientation of about 90% to 100% in the ortho position,
B. having said phenol selected from the group consisting of phenol, meta-substituted phenols and mixtures of phenol and substituted phenols,
C. having condensed phenol-aldehyde linkages wherein 25 to 90% of said linkages are benzyl ether linkages having a final orientation essentially in the ortho position and 10 to 75% are methylene linkages taking a final orientation of about 70 to 90% in the ortho position and about 10 to 30% in the para position,
D. having an average degree of polymerization of less than 4.0, and
E. having said methylol groups partially etherified with monohydric alcohols, said etherified resoles being prepared by first reacting said phenol and said formaldehyde in an aqueous reaction mixture under reflux at about 80° C. to 100° C. in the presence of a divalent electropositive metal ion, while maintaining the pH in the range of about 4 to 7, wherein said pH is controlled by having a sufficient amount of an organic acid present, forming said resole in said reaction mixture, etherifying said resole with a monohydric alcohol at a temperature of 65° to 100° C., in said reaction mixture and dehydrating the resultant aqueous reaction mixture to a water content of less than about 1 weight percent and an alcohol content of less than about 5% by weight providing an etherified high ortho resole resin as a single phase clear liquid varnish.

2. A coating composition of claim 1, said composition additionally containing a solvent for said resole and said coreactive resin.

3. A coating composition of claim 2 wherein said solvent is selected from the group consisting of lower alkanols, lower alkones or aromatic and aliphatic hydrocarbons.

4. A coating composition of claim 3 wherein said solvent is a solvent selected from the group consisting of ethanol, methanol, propanol, acetone, methyl ethyl ketone, benzene, toluene, xylene, naphthalene, nonene and petroleum fractions.

5. A composition of claim 1 wherein said coreactive resin contains coreactive functional groups selected from the group consisting of hydroxyl, carboxyl, amide, keto, methylol, isocyanate and alkoxymethyl, acetal or mixtures thereof.

6. A composition of claim 1 wherein said coreactive resin is selected from the group consisting of alkyl, epoxy, polyvinyl formal, polyvinyl butyral, polyester, polyvinyl acetate, polyvinyl alcohol, polyamide, polyurethane, polyether and polyacrylate and mixtures thereof.

7. A composition of claim 1 wherein said coreactive resin has a low molecular weight resin having a molecular weight of less than about 10,000 and about 80 to 98% of coating forming oligomeric components.

8. A coating composition of claim 1 having present a catalyst to cure said composition.

9. A coating composition of claim 8 wherein said catalyst is an acid selected from the group consisting of sulfonic, phosphoric, oxalic, acetic, adipic, succinic, lactic, benzoic or mixtures thereof.

10. A coating composition of claim 1 wherein said meta substituted phenol is a phenol having at least one attached radical selected from the group consisting of alkyd, aryl, cycloalkyl, alkenyl, cycloalkenyl, alkaryl, aralkyl, carbocyclic, halogen and mixtures thereof.

11. A coating composition of claim 1 wherein said substituted phenol is a phenol substituted with a material selected from the group consisting of indenes, vinylidene aromatics, cyclopentadienes, dicyclopentadienes, nonenes, octenes, terpenes and mixtures thereof.

12. A composition of claim 1 wherein said divalent electropositive metal ion is provided by a compound selected from the group consisting of oxides, hydroxides and organic acid salts of such metal ions, and wherein said resole resins are prepared in the presence of said compounds wherein the amount of said compound is within the range of about 0.1 to 10.0 weight percent based on the weight of said phenols.

13. A composition of claim 1 wherein said divalent electropositive metal ion is selected from the group consisting of zinc ($Zn++$), cobalt ($Co+++$), magnesium ($Mg++$), manganese ($Mn++$) and calcium ($Ca++$) or mixtures thereof.

14. A composition of claim 1 wherein the monohydric alcohol is selected from the group consisting of alkyl and aralkyl.

15. A composition of claim 1 wherein said alcohol is incorporated in amounts of about 0.05 to 0.50 methylol ether groups per phenolic group.

* * * * *